US008291377B2

(12) United States Patent
Snover et al.

(10) Patent No.: US 8,291,377 B2
(45) Date of Patent: Oct. 16, 2012

(54) EXTERNAL CONFIGURATION OF PROCESSING CONTENT FOR SCRIPT

(75) Inventors: Jeffrey P. Snover, Woodinville, WA (US); Bruce Gordon Payette, Bellevue, WA (US); Dana Jin Huang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1649 days.

(21) Appl. No.: 11/339,127

(22) Filed: Jan. 25, 2006

(65) Prior Publication Data

US 2007/0174813 A1 Jul. 26, 2007

(51) Int. Cl.
G06F 9/44 (2006.01)
G06F 9/45 (2006.01)
(52) U.S. Cl. ........ 717/115; 717/120; 717/139; 717/154; 717/169
(58) Field of Classification Search .................. 717/115, 717/116; 714/15; 726/4, 23
See application file for complete search history.

(56) References Cited

U.S. PATENT DOCUMENTS

| 5,586,260 | A |   | 12/1996 | Hu |  |
| 5,587,902 | A | * | 12/1996 | Kugimiya | .......................... 704/2 |
| 5,740,441 | A |   | 4/1998 | Yellin et al. |  |
| 5,787,177 | A |   | 7/1998 | Leppek |  |
| 5,796,393 | A |   | 8/1998 | MacNaughton |  |
| 5,918,228 | A |   | 6/1999 | Rich |  |
| 5,983,348 | A |   | 11/1999 | Ji |  |
| 6,029,245 | A |   | 2/2000 | Scanlan |  |
| 6,038,394 | A | * | 3/2000 | Layes et al. | ................... 717/139 |
| 6,067,559 | A | * | 5/2000 | Allard et al. | ................... 709/202 |
| 6,182,142 | B1 |   | 1/2001 | Win |  |
| 6,189,103 | B1 |   | 2/2001 | Nevarez |  |
| 6,205,465 | B1 | * | 3/2001 | Schoening et al. | ........... 718/102 |
| 6,279,111 | B1 |   | 8/2001 | Jensenworth |  |
| 6,292,936 | B1 | * | 9/2001 | Wang | ............................ 717/115 |
| 6,330,689 | B1 | * | 12/2001 | Jin et al. | ......................... 714/15 |
| 6,341,312 | B1 |   | 1/2002 | French |  |
| 6,377,994 | B1 |   | 4/2002 | Ault |  |
| 6,442,564 | B1 |   | 8/2002 | Frey |  |
| 6,473,893 | B1 | * | 10/2002 | Kay et al. | ....................... 717/116 |
| 6,931,546 | B1 | * | 8/2005 | Kouznetsov et al. | ........... 726/23 |

(Continued)

FOREIGN PATENT DOCUMENTS

KR 2002-0043917 6/2002

(Continued)

OTHER PUBLICATIONS

Jie Huang et al. "Cascades: Scalable, Flexible and Composable Middleware for Multimodal Sensor Networking Applications", [Online], 2006, pp. 1-8, [Retrieved from Internet on Jun. 11, 2012], <http://web.cecs.pdx.edu/~nbulusu/papers/mmcn06.pdf>.*

(Continued)

Primary Examiner — Thuy Dao
Assistant Examiner — Ziaul A Chowdhury
(74) Attorney, Agent, or Firm — Workman Nydegger

(57) ABSTRACT

Script is accessed and interpreted to identify an executable component. Processing context configuration files may then be used to identify an appropriate processing context for the identified executable component. Examples of processing context include, but are not limited to, a process in which the identified executable component is to run, one or more adaptations to perform on the component prior to running, and/or a security context in which to run the component. Processing context thus need not be specified in the actual script itself. The identified components may then be executed in the identified processing context.

19 Claims, 4 Drawing Sheets

U.S. PATENT DOCUMENTS

| | | | | |
|---|---|---|---|---|
| 6,957,228 | B1* | 10/2005 | Graser | 707/103 R |
| 6,968,539 | B1* | 11/2005 | Huang et al. | 717/115 |
| 7,065,784 | B2* | 6/2006 | Hopmann et al. | 726/4 |
| 7,337,034 | B1* | 2/2008 | Lensing et al. | 700/121 |
| 7,343,584 | B1* | 3/2008 | Plain et al. | 717/104 |
| 7,380,237 | B2* | 5/2008 | Goring et al. | 717/115 |
| 7,448,022 | B1* | 11/2008 | Ram et al. | 717/120 |
| 7,802,089 | B2* | 9/2010 | Snover et al. | 713/152 |
| 8,079,025 | B2* | 12/2011 | Marchant | 717/166 |
| 8,099,713 | B2* | 1/2012 | Becker et al. | 717/115 |
| 2002/0010803 | A1* | 1/2002 | Oberstein et al. | 709/318 |
| 2002/0066024 | A1 | 5/2002 | Schmall et al. | |
| 2002/0073330 | A1 | 6/2002 | Chandnani et al. | |
| 2003/0154202 | A1 | 8/2003 | Dinker et al. | 707/100 |
| 2003/0217352 | A1* | 11/2003 | Ueno et al. | 717/115 |
| 2004/0073810 | A1 | 4/2004 | Dettinger et al. | |
| 2004/0083383 | A1 | 4/2004 | Carmona | |
| 2004/0088689 | A1* | 5/2004 | Hammes | 717/154 |
| 2004/0162997 | A1* | 8/2004 | Hopmann et al. | 713/201 |
| 2005/0015775 | A1 | 1/2005 | Russell et al. | 719/315 |
| 2005/0076344 | A1* | 4/2005 | Goring et al. | 719/320 |
| 2005/0149726 | A1 | 7/2005 | Joshi | |
| 2005/0198639 | A1* | 9/2005 | Matsui | 718/100 |
| 2005/0283838 | A1 | 12/2005 | Saito | |
| 2006/0184931 | A1* | 8/2006 | Rochette et al. | 717/169 |

FOREIGN PATENT DOCUMENTS

| | | |
|---|---|---|
| WO | WO 02/100034 A1 | 12/2002 |
| WO | WO 2004/074952 | 9/2004 |
| WO | 2005031566 | 4/2005 |
| WO | WO 2005/106658 | 11/2005 |

OTHER PUBLICATIONS

Bryant Gipson et al., "2dx User-friendly image processing for 2D crystals", [Online], 2006, pp. 1-9, [Retrieved from Internet on Jun. 11, 2012] , <http://www.c-cina.unibas.ch/publications/pdf/gipson-jsb-2006-2dx_image.pdf>.*

Matthew J. Rutherford et al., "Reconfiguration in the Enterprise JavaBean Component Model", [Online], 2002, pp. 1-15 [Retrieved from Internet on Jun. 11, 2012], <http://www.dtic.mil/cgi-bin/GetTRDoc?AD=ADA436730>.*

Andrew T. Campbell et al., "NetBind: A Binding Tool for Constructing Data Paths in Network Processor-Based Routers", [Online], 2002, pp. 1-13, [Retrieved from Internet on Jun. 11, 2012], <http://citeseerx.ist.psu.edu/viewdoc/download?doi=10.1.1.68.5896&rep=rep1&type=pdf>.*

USINEX: Interface and Execution Models in the Fluke Kernel, Bryan Ford, Mike Hibler, Jay Lepreau, Roland McGrath & Patrick Tullmann. University of Utah, Feb. 1999.

M-JavaMPI: A Java-MPI Binding with Process Migration Support: Ricky K.K. Ma, Cho-Li Wang, and Francis C.M. Lau. p. 1-9.

Built-in Contract Testing in Model-driven, Component-Based Development: Colin Atkinson and Hans-Gerhand Gro.

"Validation: Windows 2000, Part 2, Improving Web Service Efficiency," Nikkei Internet Technology, No. Dec. 1999 (No. 29), pp. 128-135, Nikkei Business Publications, Inc., Nov. 22, 1999, ISSN: 1343-1676.

"Deamons & Dragons, Measures for Spam, Thread Programming, Access Control," UNIX Magazine, No. Jun. 2000 (vol. 15, No. 6), pp. 87-96, ASCII Corporation, Jun. 1, 2000.

Yoshihiro Yamada, "You Certainly Can! Basics, ASP.NET, Tenth Installment, Let's Make Efficient Application Management by Using a Configuration File," Monthly Magazine, dot NET Magazine, No. Aug. 2004 (vol. 10, No. 7), pp. 164-167, Shoeisha Co., Ltd., Aug. 1, 2004.

"Introduction to SELinux, Building a Safe Server by Using a Secure OS, Second Installment, Basic Knowledge of SELinux," Nikkei Linux, No. Oct. 2003 (vol. 5, No. 10), pp. 141-148, Nikkei Business Publication, Inc., Sep. 8, 2003, ISSN: 1345-0182.

U.S. Appl. No. 09/360,530, filed Jul. 26, 1999, Hopmann.

Gélinas, Jacques, "Virtual Private Servers and Security Contexts", maintained by (jack@solucorp.qc.ca), updated Oct. 5, 2004, entire document.

Product Focus: Behavior-Blocking Stops Unkown Malicious Code:; Andrew Conry-Murray, Network Magazine, Jun. 5, 2002.

"It's time to Rethink your Coporate Malware Strategy"; Nick Del Grosso, GSEC Practical Assignment v1.3; Feb. 24, 2002.

David Evans et al., "Splint Manual Version 3.1.1.1-1" Jun. 5, 2003, Programming Group, University of Virginia department of Computer Science, Virginia, USA, XP007908263, Retrieved from the Internet: <http://www.splint.org/downloads/manual.pdf> on Apr. 20, 2009.

"Flawfinder MAN Page" May 30, 2004, XP007908262, retrieved from the internet: http://www.dwheeler.com/flawfinder/flawfinder.pdf> 9 pages.

Compilers, Techniques, and Tool: Alfred V. Aho, Ravi Sethi, Jeffrey D. Ullman, Retrieved from the internet Jan. 25, 2006, 11 pages.

Auslender, Andres, "Insider Threat Detector, an Integral Approach to Discover Malicious Source Code", MSC Thesis, Department of Computer and Systems Sciences, Stockholm's University/Royal Institute of Technology, 2005. http://www.dsv.su.se/research/seclad/pages/pdf-files/2005-x-208.pdf.

U.S. Appl. No. 10/779,221, Mail Date Oct. 25, 2005, Office Action.
U.S. Appl. No. 10/779,221, Mail Date Mar. 31, 2006, Notice of Allowance.
U.S. Appl. No. 11/339,397, Mail Date Apr. 30, 2009, Office Action.
U.S. Appl. No. 11/339,397, Mail Date Nov. 3, 2009, Office Action.
U.S. Appl. No. 11/339,397, Mail Date Mar. 16, 2010, Office Action.
U.S. Appl. No. 11/339,397, Mail Date Jul. 19, 2010, Notice of Allowance.

* cited by examiner

EXTERNAL CONFIGURATION OF PROCESSING CONTENT FOR SCRIPT

BACKGROUND

Background and Relevant Art

Computing systems have revolutionized the way we work and play. Computing systems come in a wide variety of forms including laptop computers, desktop computers, personal digital assistants, telephones, and even devices that have not been conventionally associated with computing systems such as, for example, refrigerators and automobiles. Computing systems may even comprise a number of constituent computing systems interconnected via a network. Thus, some computing systems may be small enough to fit in the palm of the hand, while others are spread over much of the globe.

Regardless of their physical form, computing systems are composed of hardware and software. The hardware includes most fundamentally at least one processor and memory. The software includes instructions that may be embodied in the memory or in storage, and that can be accessed and executed by the processor(s) to direct the overall functionality of the computing system. Thus, software is critical in enabling and directing the functionality of the computing system.

The software in a typical computing system will typically include an operating system and application programs. The operating system typically provides the core functionality common across multiple application programs. For instance, the operating system provides Application Program Interfaces (often termed "APIs") that provide underlying file systems, memory management, security, networking, user interfacing, and other core functionality to application programs. The operating system also initiates, manages, and terminates multiple processes on a single computing system.

A "process" is a term of art that is used to describe a virtual address space that includes a collection of resources that may be shared by one or more running executable components that are included in that process. The resources may include a process identifier, one or more execution threads, file handles, shared memory, and shared processor time. A process may also impose constraints on the executable component(s) that are run in that process so that order may be properly maintained. For instance, a process may expect a data structure or object of a particular type to have a specific structure, and may require that each component executing in the process use memory in a consistent manner.

"Script" is a term used to describe a sequence of commands that may be interpreted to form computer-executable instructions during run-time immediately before the computer-executable instructions are actually executed by the processor(s). Often, the commands will be used to execute specific components. The components invoked by the script are run in a certain processing context that is implied or expressed in the script that invokes the component. The processing context may include the process that the component runs in and the security context in which the component is run. For instance, the security context may specify that the security mechanism for the component is to treat the user as a particular entity, and/or to run the component on a particular machine. It may be needful or advantageous for components to be run in a particular processing context.

As a specific example, by default, the script may invoke a component that is run within a particular process. However, the component may not be compatible with the current process. For instance, the component may rely on a functions library that is not available to the process, or perhaps the component may not function as intended within the context of that process. Alternatively or in addition, the script may have been drafted by an author that is not trusted within the context of that process. In any of these cases, the script language may be altered to specify that the component is to be run in a different process. Furthermore, if the component is to be run outside of a default security context, that security context would be identified as well in the script language.

Thus, whenever a processing context of a script component is outside of the default processing context, the script is changed as well to reflect the new processing context. Altering the script in this manner can be a cumbersome process.

BRIEF SUMMARY

Script is accessed and interpreted to identify an executable component. Processing context configuration files may then be used to identify an appropriate processing context for the identified executable component. Examples of processing context include, but are not limited to, a process in which the identified executable component is to run, one or more adaptations to perform on the component prior to running, and/or a security context in which to run the component. Processing context thus need not be specified in the actual script itself.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to the identifying of a processing context associated with one or more components executed by a script, without having to refer to processing context identification within the script itself. Thus, if the processing context changes, the script itself need not change. Instead, one or more processing context configuration files associated with each component are referred to in identifying the processing context. Should the processing context for a script component change, the configuration files are simply altered, rather than changing any script that invokes that component.

First, an example computing system in which the principles of the present invention may operate will be described with respect to FIG. 1. Then, the principles of the present invention will be described in further detail with respect to the subsequent FIGS. 2, 3, 4, 5A, 5B and 5C. The embodiments of the present invention may comprise a special purpose or general-purpose computer including various computer hardware, as discussed in greater detail below.

Figure 1:
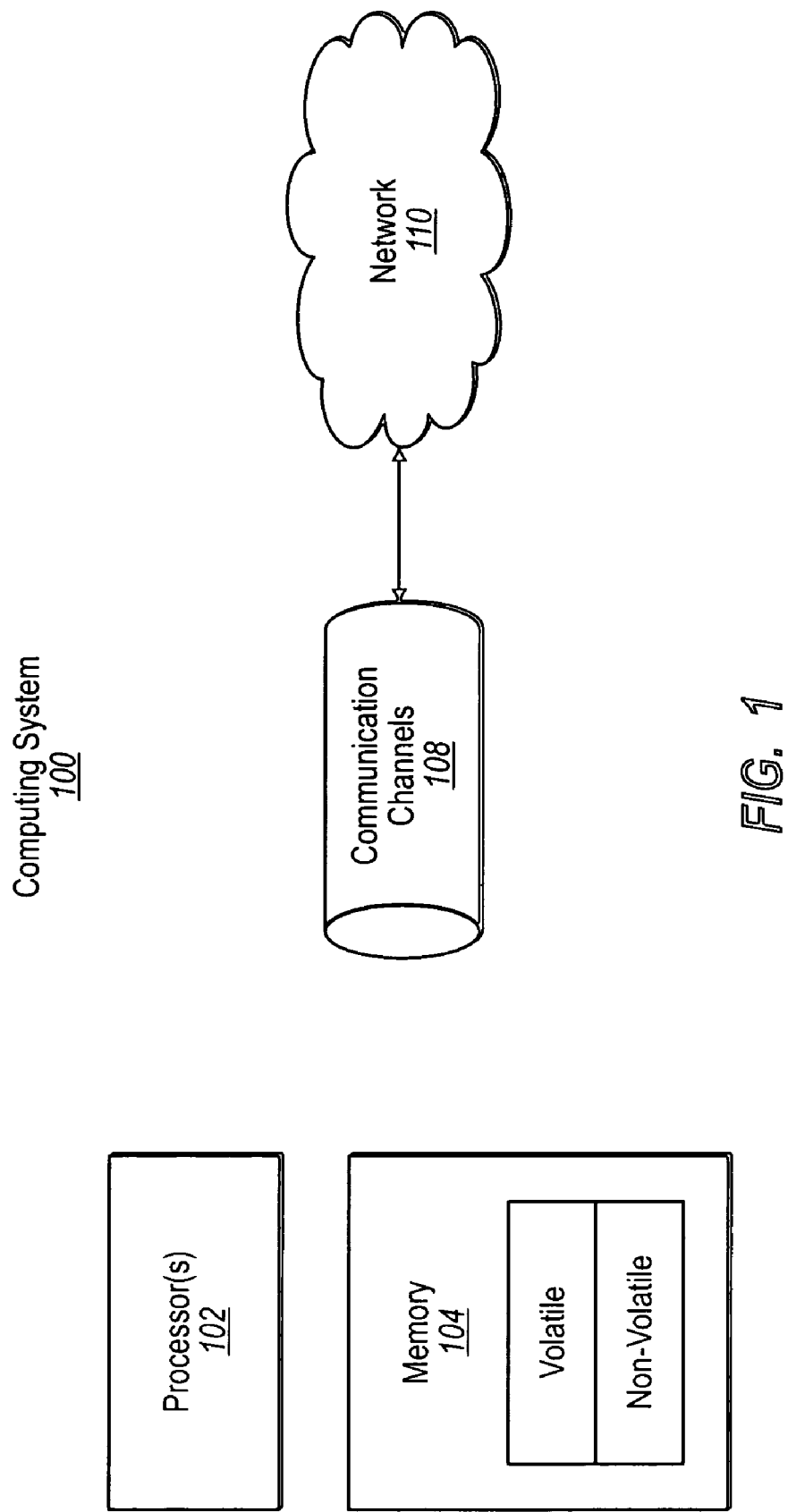
FIG. 1 illustrates a suitable computing environment in which the principles of the present invention may be employed.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads) as part of a protocol. While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 2:
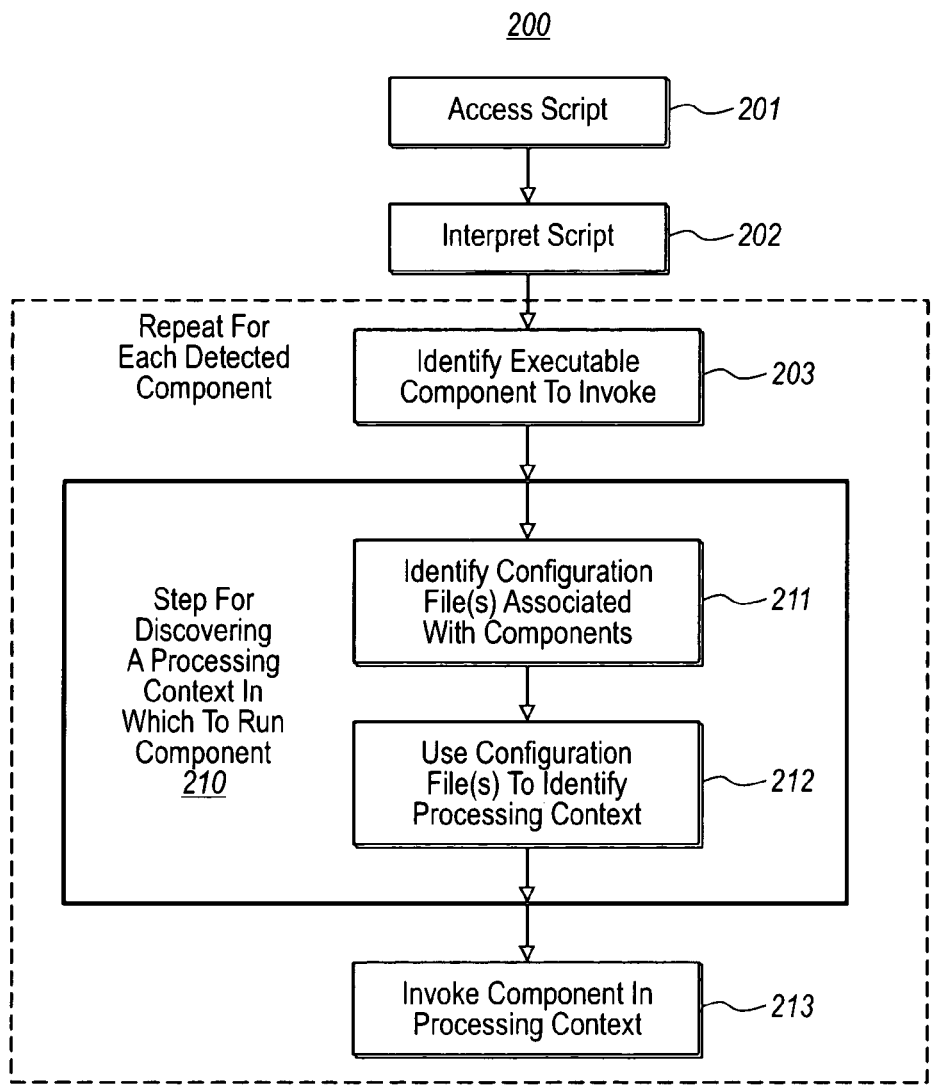
FIG. 2 illustrates a flowchart of a method for identifying a particular processing context for running script in a computing system.
Figure 4:
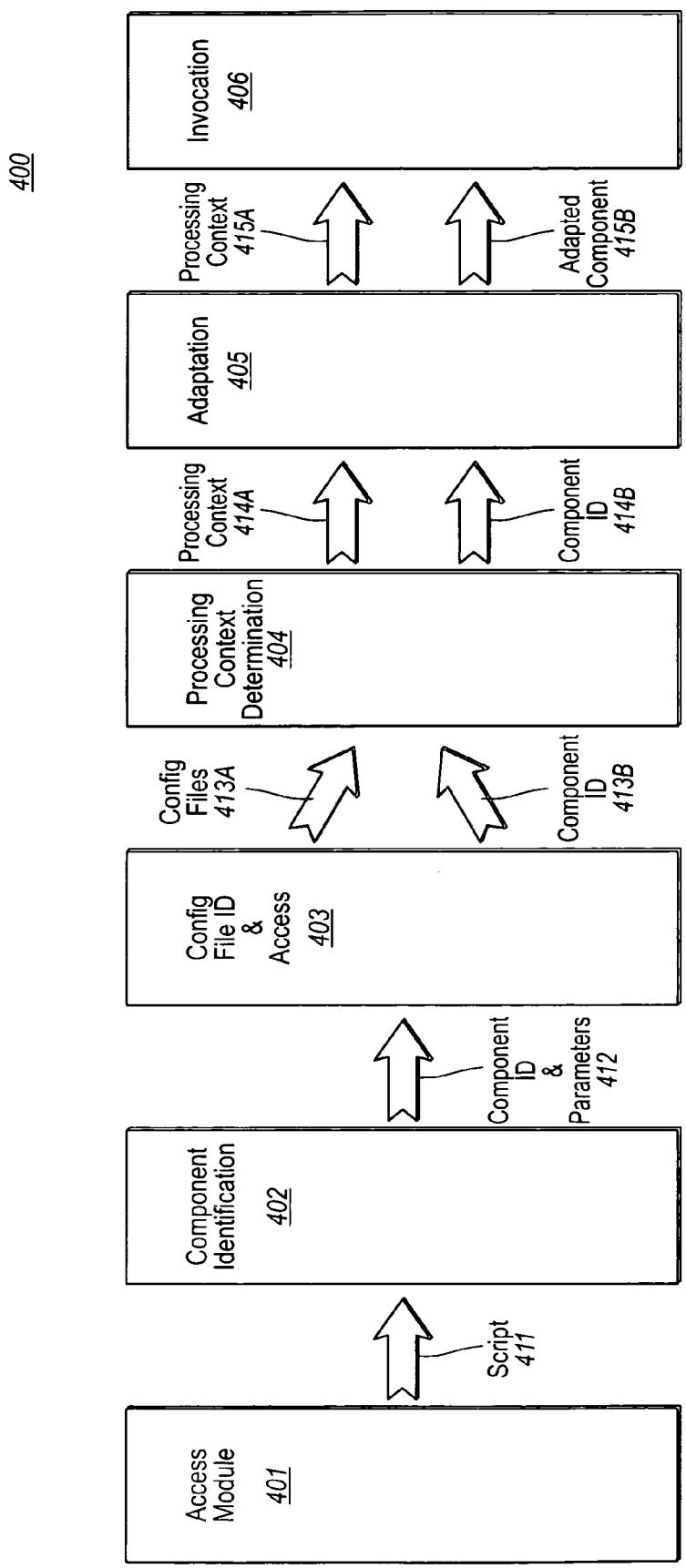
FIG. 4 illustrates a processing flow associated with the method for identifying a particular processing context of FIG. 2.

FIG. 2 illustrates a flowchart of a method 200 for identifying a particular processing context for running script in a computing system. The computing system may be structured as described above for the computing system 100 of FIG. 1, although any computing system that is capable of executing script and otherwise being adaptable to perform the principles of the present invention will suffice. FIG. 4 illustrates a processing flow 400 including various components and data that may be used to implement the method 200 of FIG. 2. Accordingly, the method 200 of FIG. 2 will be described with frequent reference to the processing flow 400 of FIG. 4.

First, the script to be executed is accessed (act 201). The script may be accessed by receiving the script from another computing system, or by accessing the script from a source internal to the computing system. For instance, if the method 200 is performed in the context of the computing system 100 of FIG. 1, the script may be accessed from the memory 104. Referring to FIG. 4, an access module 401 accesses script 411 and provides the script 411 to components further along the processing flow 400. Mechanisms for accessing script are known in the art and thus will not be described in detail here. The script 411 may include a script command line, multiple script command lines and/or perhaps even just a portion of one or more command lines. For instance, the script 411 may be just a portion of a script pipeline command.

Next, the script is interpreted (act 202) to identify one or more executable components to invoke (act 203). There are a number of conventional ways to interpret script to thereby identify one or more components to invoke. The principles of the present invention are consistent with any of those conventional methods and are also likely compatible with script interpretation technology that is yet to be developed so long as that script interpretation allows for the identification of components being invoked by that script. Referring to FIG. 4, the component identification module 402 receives control of the script 411 from the script access module 401 to permit the component identifiers and associated parameters (collectively referred to as element 412) to be provided further along the processing flow 400.

Referring back to FIG. 2, for each identified executable component, a functional, result-oriented step for discovering a processing context in which the script should be executed at least based on one or more processing context configuration files (step 210) is performed. While this step may be performed by using any combination of corresponding acts that accomplished this purpose, the step 210 is illustrated as being accomplished using constituent acts 211 and 212 in FIG. 2.

Figure 3:
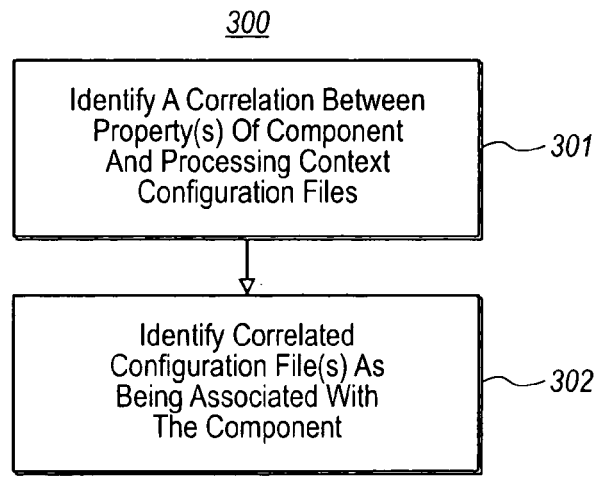
FIG. 3 illustrates a flowchart of a method for identifying one or more processing context configuration files associated with the identified executable component.

Specifically, one or more processing context configuration files associated with the identified executable component are identified (act 211). FIG. 3 illustrates one contemplated method 300 for identifying one or more processing context configuration files associated with an identified executable component. A correlation is identified between one or more properties of the identified executable component and one or more configuration files (act 301). Then, the correlated one or more configuration files are identified as being the one or more processing context configuration files (act 302).

For instance, perhaps the name of the executable components alone is sufficient to identify one or more associated processing context configuration files. Component dependencies may also be useful in identifying associated processing context configuration files. For instance, a component may depend on a particular functions library for proper execution. The author, creation date, version number, and the like may also be relevant properties used to identify one or more associated configuration files. Referring to FIG. 4, the processing context identifying and access module 403 uses the component identifier and parameter(s) provided by the component identification module 402 to provide the configuration files 413A and associated component identifier 413B (which in some embodiments may be included within the configuration file(s)) further down the processing flow 400.

The processing context configuration files are then used to identify the processing context of the associated component. The processing context of the component may include, for example, any one or more of the following: an identification of a process in which to run the identified executable component, one or more adaptations to perform on the identified executable component prior to being run (e.g., change the name or type of a field, or perform some calculation), a security context in which to run the identified executable component (e.g., an identification of a user security context, or an identification of a machine on which to run the component). Referring to FIG. 4, the processing context determination module 404 uses the configuration files 413A and component identifiers 413B to identify the processing context 414A for each component.

Several concrete examples will now be provided to clarify the principles more generally described above. In a first example, consider a script that includes the sequential execution of three components, C1 followed by C2 followed by C3. This may be represented by the following sequence: C1|C2|C3. Now suppose that there has been some change to component C2 which no longer makes it advisable or possible to have the component run in the same process as components C1 and C3. In that case, the processing context configuration file might read as follows for component C2 if represented in one eXtenstible Markup Language (XML) format.

```
<CMD Name = "C2">
    <OutOfProcess>True</OutOfProcess>
</CMD>
```

The use of such a configuration file makes it much easier to change the processing context of the configuration file. For instance, if the component C2 were changed such that it is once again advantageous to run the component C2 in the same process with components C1 and C3, the processing context configuration file may once again be changed to reflect this change as opposed to changing all script that references component C2. For instance, the configuration file may be changed to read as follows:

```
<CMD Name = "C2">
    <OutOfProcess>False</OutOfProcess>
</CMD>
```

In this example, the configuration file is identifiable by the name of the component. However, as previously mentioned, the configuration file(s) may be identified by other properties of the component such as author, creation date, or others.

As mentioned above, the processing context may involve much more than whether or not the component is run in-process or out-of-process. Take, for example, the following configuration file specifying a far more complex processing context for component C2:

```
<CMD Name = "C2">
    <Version>V2</Version>
    <Adaptor>LMD=>MD</Adaptor>
    <OutOfProcess>True</OutOfProcess>
    <RunAsUser>Bob</RunAsUser>
    <HostComputer>Bobs</HostComputer>
</CMD>
```

Here, the processing context configuration file for component C2 specifies what version of interpreter is required to run in the process. Thus, if the component C2 requires a different version of the interpreter than components C1 and C3, the component C2 would be run out-of-process unless different versions of the interpreter were possible in the same process.

The "Adaptor" element specifies an adaptation that is to be performed prior to execution of the component. Here, the LMD (Last Modified Date) Field is changed to the MD (Modified Date) field. This allows the component C2 to be modified in a manner that allows the component to be executed within the component execution sequence. Referring to FIG. 4, the adaptation component 405 may modify the component identified by the component identifier 414B according to any adaptations specified in the processing context 414A. The adaptation module 405 then provides the processing context 415A and the adapted component 415B to the invocation component 406.

The "OutOfProcess" field specifies that the component C2 is to be run out-of-process. The "RunAsUser" filed specifies that the component C2 is to have the same security context as is permissible should the identified user be making the same requests. In the example case, the system will permit all operations being performed by component C2 so long as the system would permit that operation if requested by Bob.

The "HostComputer" field specifies the host computer on which the component C2 is to be executed. In this case, the component C2 is to run on the host computer identified as "Bobs". As previously mentioned, the execution is performed using the security context for Bob on that host computer since the "RunAsUser" field specifies "Bob".

Referring back to FIG. 2, the invocation component then invokes the identified executable component in the identified processing context (act 213). This invocation may be performed on the same computing system as or on a different computing system than the computing system that interpreted the script. For instance, in the above example, if the host computer "Bobs" is not the same computer that runs the invocation module 406, then the invocation module 406 may perform any actions helpful to remote the component C2 on the proper host computer identified as "Bobs". Whether the component is remotely invoked or not, the invocation module 406 may return the results of the component C2 execution.

Figure 5A:
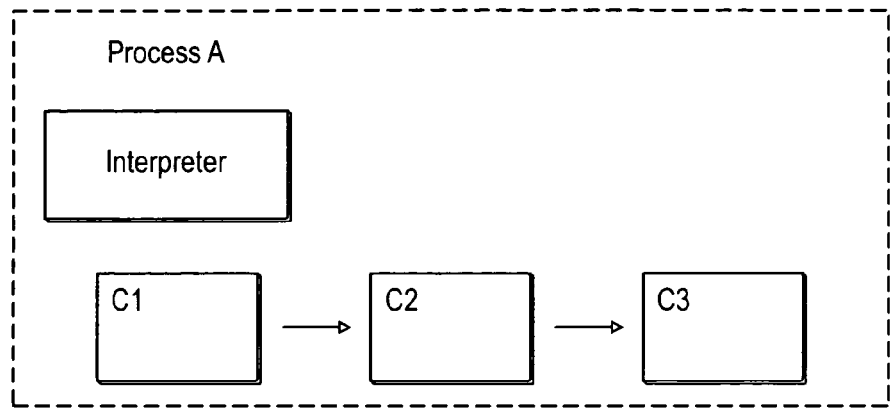
FIG. 5A schematically illustrates processing in which multiple components of a script are run within a single process, but in which the processing context of the second components is changed to reflect that some adaptation of the second component is to occur prior to execution.
Figure 5B:
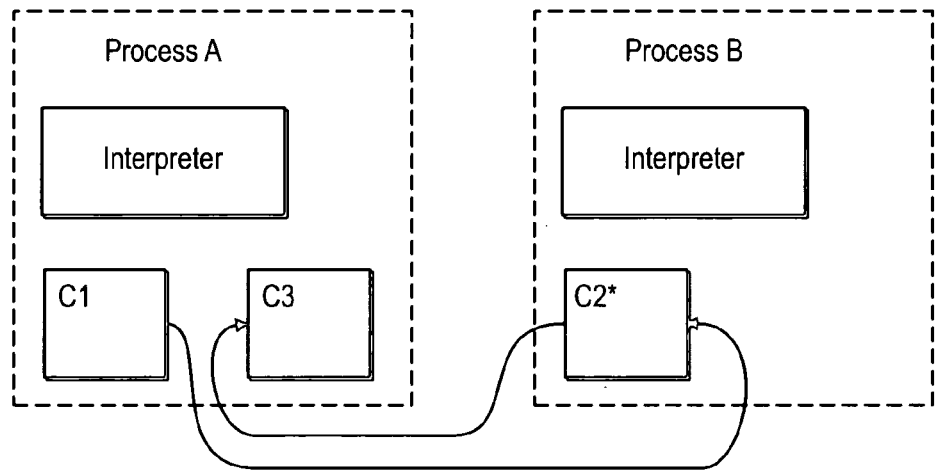
FIG. 5B schematically illustrates processing in which multiple components of a script are run in separate processes, with potentially some pre-processing adaptation or other processing context to be enforced on one of the components prior to execution.

FIG. 5A illustrates an example in which all three components C1, C2 and C3 are run in the same process, but with component C2 being adapted to be compatible with running in the same process as components C1 and C3. Each process instantiates its own interpreter for interpreting the script. FIG. 5B illustrates an example in which component C2 is run out-of-process. In this case, the component C2 may also be adapted as specified in the configuration file.

Figure 5C:
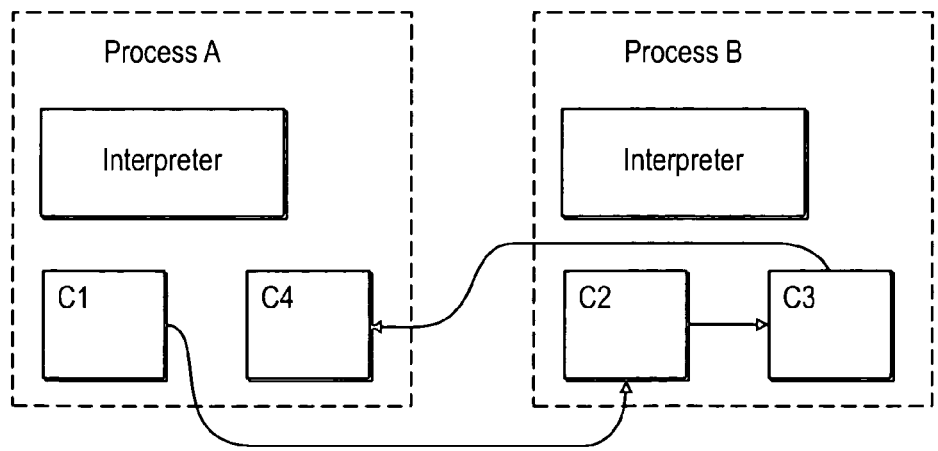
FIG. 5C schematically illustrates processing in which multiple components are run in separate process, and in which processing control may pass between subsequent components in a child process without passing control back to a parent process.

FIG. 5C illustrates another example in which four components are executed in sequence as represented by the sequence C1|C2|C3|C4. In this case, components C1 and C4 are run in Process A, whereas components C2 and C3 are run in Process B. In this case, the processing context determination module 404 may use the processing context configuration files for components C2 and C3 to identify that the components should not be run in-process within Process A. The processing context determination module 404 then makes another determination as to whether or not the components C2 and C3 are compatible such that they may run in the same process outside of Process A. For instance, if components C2 and C3 depend on different functions libraries that cannot be run in the same process, components C2 and C3 would have to run in different processes outside of Process A.

In this case, however, the processing context determination module 404 has decided that components C2 and C3 can run in the same process within Process B. In such a case, there are processing efficiencies since processing control does not need to be returned from component C2 back to Process A, before passing processing control back to Process B for execution of component C3. Instead, execution of component C2 may smoothly transition to execution of component C3 within the same Process B.

Accordingly the principles of the present invention provide a flexible mechanism for specifying and altering the processing context in which a script component is to be executed, without requiring that the script itself be altered to specify the processing context.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for identifying a particular processing context for running script in a computing system such that the default context is modified, the method comprising:
   at a computing system, using one or more processors to:
      access a script, wherein the script is just a portion of a script pipelined command:
      interpret a script to identify a plurality of executable components to invoke, wherein the plurality of executable components have a default context in which they are each run within a first process;
      identify one or more properties of a first of the plurality of identified executable components, the one or more properties being contained within the script;
      identify one or more processing context configuration files associated with the first of the plurality of identified executable components by using the one or more properties, the one or more processing context configuration files being separate from the script; and
      use the one or more processing context configuration files to identify a processing context for the identified first executable component, wherein the identified processing context for the first executable component is different than the default context and defines a modified context in which the first executable component is removed from the first process and is run within a second process that is different than the first process and wherein a particular version of an interpreter is required to run any process in which the first executable component is run.

2. A method in accordance with claim 1, wherein the default context includes an identification of the first process in which to run the identified plurality of executable components.

3. A method in accordance with claim 1, wherein the processing context includes one or more adaptations to perform on the identified executable component prior to being run, the one or more adaptations being in addition to moving the first executable component from the first process.

4. A method in accordance with claim 1, wherein the processing context includes a security context in which to run the identified executable component.

5. A method in accordance with claim 4, wherein the security context includes an identification of a user security context.

6. A method in accordance with claim 1, wherein the one or more processors act with an executable interpretation component to interpret the script.

7. A method in accordance with claim 1, wherein identifying one or more processing context configuration files associated with a first of the plurality of identified executable component comprises:
identifying a correlation between the identified one or more properties of the identified first executable component and one or more configuration files; and
identifying the correlated one or more configuration files as being the one or more processing context configuration files.

8. A method in accordance with claim 7, wherein the one or more properties includes at least a name of the identified first executable component.

9. A method in accordance with claim 7, wherein the one or more properties includes at least a dependency of the identified first executable component.

10. A method in accordance with claim 1, further comprising:
invoking the identified first executable component in the identified processing context, and as part of the second process.

11. A method in accordance with claim 10, wherein the default context is to run each of the plurality of components on the computing system interpreting the script, and wherein invoking the identified first executable component in the identified processing context is performed on a computing system that is different than the computing system that interpreted the script, and due to the processing context modifying the default context to run the first executable component on a particular computing system.

12. A method in accordance with claim 1, further comprising:
instantiating a first interpreter, the first interpreter being specific to the first process; and
instantiating a second interpreter, the second interpreter being specific to the second process, such that the first and second processes each have their own interpreters.

13. A computer program product comprising one or more computer-readable storage media having stored thereon computer-executable instructions that, when executed by a processor of a computing system, perform a method for identifying a particular processing context for running script in a computing system and modifying a default context, the performed method comprising:
accessing a script, wherein the script is lust a portion of a script pipeline command;
interpreting the script to identify a plurality of executable components to invoke, wherein the plurality of executable components have a default context in which they are each run within a first process and wherein each of the executable components are associated with one or more properties within the script;
identifying, by examining the script and correlating the one or more properties within the script, one or more processing context configuration files that are external to the script and which are associated with a first of the plurality of identified executable components; and
identifying a processing context in which the script should be executed by using the one or more processing context configuration files, wherein the processing context for the first executable component is different than the default context and defines a modified context in which the first executable component is removed from the first process and is run within a second process that is different than the first process and wherein a particular version of an interpreter is required to run any process in which the first executable component is run.

14. A computer program product in accordance with claim 13, wherein the processing context includes, in addition to the removal of the first executable component from the first process, at least one of the following:
one or more adaptations to perform on the identified first executable component prior to being run; or
a security context in which to run the identified executable component.

15. A computer program product in accordance with claim 14, wherein the processing context includes each of:
the one or more adaptations to perform on the identified first executable component prior to being run; and the security context in which to run the identified executable component.

16. A computer program product in accordance with claim 13, wherein the method further comprises:
invoking the identified first executable component in the identified processing context, such that the first executable component is executed in the second process rather than the first process.

17. A computer program product in accordance with claim 13, wherein the first process and second process each have their own interpreters.

18. A computer program product comprising one or more computer-readable storage media having stored thereon computer-executable instructions that, when executed by a processor of a computing system, perform a method for identifying a particular processing context for running script in a computing system and modifying a default context, the performed method comprising:
accessing a script, wherein the script is just a portion of a script pipeline command;
interpreting the script to identify a plurality of executable components to invoke, wherein the plurality of executable components have a default context in which they are each run within a first process;
discovering, by examining the script, one or more processing context configuration files that are external to the script and which are associated with a first of the plurality of identified executable components, wherein the at least one of the one or more processing context configuration files for the first executable component has a name that corresponds to a name of the first executable component;
discovering a processing context in which the script should be executed, wherein the discovering is performed by examining the one or more processing context configuration files, wherein the processing context for the first executable component is an adaptation to perform on the identified first executable component prior to running the first executable component, which modifies the default context to a modified context in which:
the first executable component is removed from the first process and is run within a second process that is different than the first process, such that removal of the first executable component from the first process changes in which process the first executable component is run, wherein removal from the first process is governed by a true false statement related to the first process, and wherein the first and second processes have their own interpreters;
a particular version of an interpreter is required to run any process in which the first executable component is run;
a user is identified, such that the first executable component is run with security contexts of the identified user, regardless of whether the identified user is involved in requesting access of the script; and a host computer is identified and used such that the second process runs on the host computer, regardless of whether the host computer also interpreted the script.

19. The computer program product of claim 18, wherein the true false statement governing removal from the first process is within an out of process tag.

* * * * *